(12) United States Patent
Ih et al.

(10) Patent No.: US 8,315,749 B2
(45) Date of Patent: Nov. 20, 2012

(54) INNOVATIVE OPTIMAL SPACECRAFT SAFING METHODOLOGY

(76) Inventors: Che-Hang Charles Ih, Rancho Palos Verdes, CA (US); Kangsik Lee, Torrance, CA (US)

(*) Notice: Subject to any disclaimer, the term of this patent is extended or adjusted under 35 U.S.C. 154(b) by 502 days.

(21) Appl. No.: 12/685,574

(22) Filed: Jan. 11, 2010

(65) Prior Publication Data

US 2011/0168848 A1    Jul. 14, 2011

(51) Int. Cl.
*B64G 1/36* (2006.01)
(52) U.S. Cl. .......... 701/13; 244/164; 244/165; 455/427; 455/12.1
(58) Field of Classification Search ............ 244/165, 244/164; 455/12.1, 427
See application file for complete search history.

(56) References Cited

U.S. PATENT DOCUMENTS

| | | | |
|---|---|---|---|
| 6,089,508 A | 7/2000 | Noyola et al. | |
| 6,138,953 A | 10/2000 | Noyola et al. | |
| 8,056,863 B2 * | 11/2011 | Wang et al. | 244/164 |
| 2002/0003193 A1 * | 1/2002 | Williams et al. | 244/165 |
| 2006/0186274 A1 | 8/2006 | Wang et al. | |
| 2010/0193641 A1 * | 8/2010 | Liu et al. | 244/165 |

FOREIGN PATENT DOCUMENTS

EP    2224307 A2    9/2010

OTHER PUBLICATIONS

Combined Search and Examination Report under Section 17 and 18(3) dated Apr. 18, 2011 in GB Patent Application No. GB1021952.5, Applicant: The Boeing Company (6pages).

* cited by examiner

*Primary Examiner* — Christopher P Ellis
*Assistant Examiner* — Medhat Badawi
(74) *Attorney, Agent, or Firm* — Vista IP Law Group LLP; Cynthia A. Dixon

(57) ABSTRACT

A system and method are disclosed for an innovative spacecraft (S/C) safing methodology. The system and method use wheel momentum to perform a rotisserie rotation so that the spacecraft can slew at a fast rate in a controlled fashion in order to keep the spacecraft power safe and maintain telemetry and command (T&C) coverage. The system and method involve a reaction wheel system and a spacecraft control processor (SCP). The SCP is in communication with the reaction wheel system. The SCP is operable to determine a rotisserie axis, and take the cross product of the rotisserie axis and a momentum vector to result in a unit vector. The SCP is further operable to slowly slew the spacecraft about the unit vector through an angle until the rotisserie axis aligns with the momentum vector, and rotate the spacecraft about the rotisserie axis to keep the spacecraft power safe.

20 Claims, 13 Drawing Sheets

INNOVATIVE OPTIMAL SPACECRAFT SAFING METHODOLOGY

BACKGROUND

The present disclosure relates to innovative optimal spacecraft (S/C) safing. In particular, it relates to a system and method that use wheel momentum to perform a rotisserie rotation so that the spacecraft can slew at a fast rate in a controlled fashion in order to keep the spacecraft power safe and maintain telemetry and command (T&C) coverage.

SUMMARY

The present disclosure relates to a system, apparatus, and method for innovative optimal spacecraft safing. In one or more embodiments, the method for innovative optimal spacecraft safing involves searching for and tracking the sun by using measurements from at least one solar array current sensor. The method further involves determining a rotisserie axis, and taking the cross product of the rotisserie axis and a momentum bias vector to result in a unit vector. Also, the method involves slowly slewing the spacecraft about the unit vector through an angle until the rotisserie axis aligns with the momentum vector. In one or more embodiments, the angle is the arccosine of a dot product of the rotisserie axis and the unit vector. Also, the method involves determining the rotisserie rate so that the maximum rate without saturating the wheels can be used. Further, the method involves rotating the spacecraft about the rotisserie axis to keep the spacecraft power safe.

In one or more embodiments, to determine the rotisserie axis, first determine if there is a failure of any of four wheels of a reaction wheel system, which are wheel 1, wheel 2, wheel 3, and wheel 4. If wheel 3 or wheel 4 fails, the projections of the spin axes of wheel 1 and wheel 2 are two candidates for the rotisseries axis. Alternately, if wheel 1 or wheel 2 fails, the projections of the spin axes of wheel 3 and wheel 4 are two candidates for the rotisseries axis. If no wheels fail, the projections of the spin axes of wheel 1, wheel 2, wheel 3, and wheel 4 are four candidates for the rotisseries axis. Then, dot product the momentum vector with each of the candidates. The candidate that results in the minimum angle with the momentum vector becomes the rotisserie axis.

In some embodiments, the system for innovative optimal spacecraft (S/C) safing involves a reaction wheel system and a spacecraft control processor (SCP). The reaction wheel system comprises four reaction wheels, which are wheel 1, wheel 2, wheel 3, and wheel 4. The spacecraft control processor is in communication with the reaction wheel system. The spacecraft control processor is operable to search for and track the sun by using measurements from at least one solar array current sensor. The spacecraft control processor is further operable to determine a rotisserie axis, and take the cross product of the rotisserie axis and a momentum vector to result in a unit vector. Further, the spacecraft control processor is operable to slew slowly the spacecraft about the unit vector through an angle until the rotisserie axis aligns with the momentum vector. Also, the spacecraft control processor is operable to rotate the spacecraft about the rotisserie axis to keep the spacecraft power safe.

In one or more embodiments, the reaction wheel system is constructed in a pyramid configuration. The base of the pyramid configuration lies on the roll-yaw plane of the spacecraft, which is the X-Z plane of the spacecraft coordinate system. The projections of the spin axis of the reaction wheels are 45 degrees apart from either the X or Z axis of the spacecraft coordinate system.

In one or more embodiments, the system for innovative optimal spacecraft (S/C) safing involves a reaction wheel system means and a spacecraft control processor means. The reaction wheel system means comprises four reaction wheels, which are wheel 1, wheel 2, wheel 3, and wheel 4. The spacecraft control processor means in communication with the reaction wheel system means. The spacecraft control processor means is operable to search for and track the sun by using measurements from at least one solar array current sensor means. Also, the spacecraft control processor means is operable to determine a rotisserie axis, and take the cross product of the rotisserie axis and a momentum vector to result in a unit vector. Further, the spacecraft control processor is operable to slew slowly the spacecraft about the unit vector through an angle until the rotisserie axis aligns with the momentum vector. Also, the spacecraft control processor is operable to determine the rotisserie rate so that the maximum rate without saturating the wheels can be used. Additionally, the spacecraft control processor means is operable to rotate the spacecraft about the rotisserie axis to keep the spacecraft power safe.

DRAWINGS

These and other features, aspects, and advantages of the present disclosure will become better understood with regard to the following description, appended claims, and accompanying drawings where:

Figure 7A:
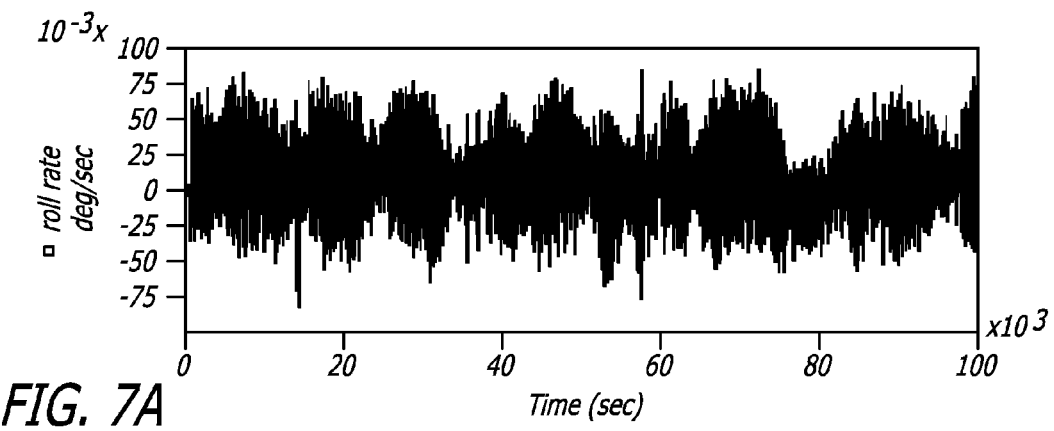
Figure 7B:
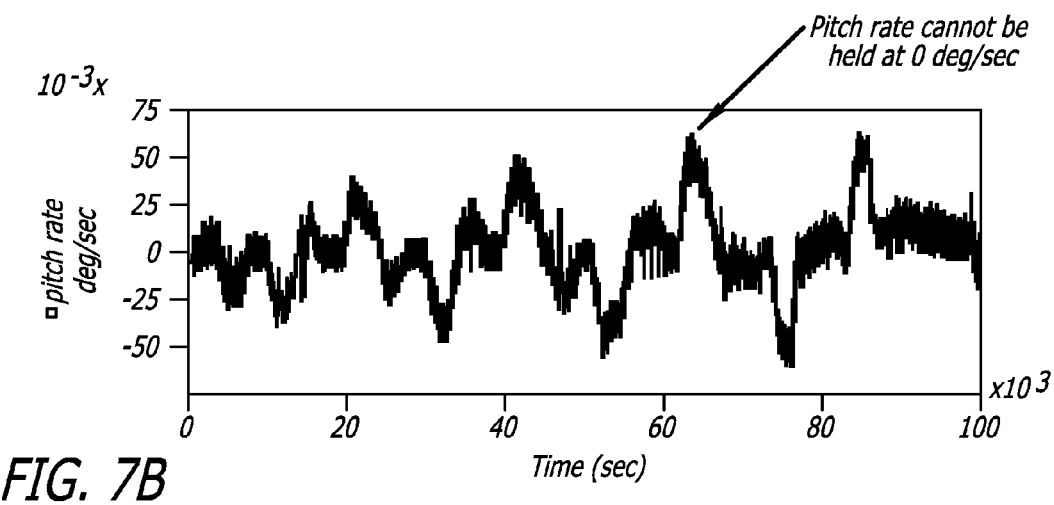
Figure 7C:
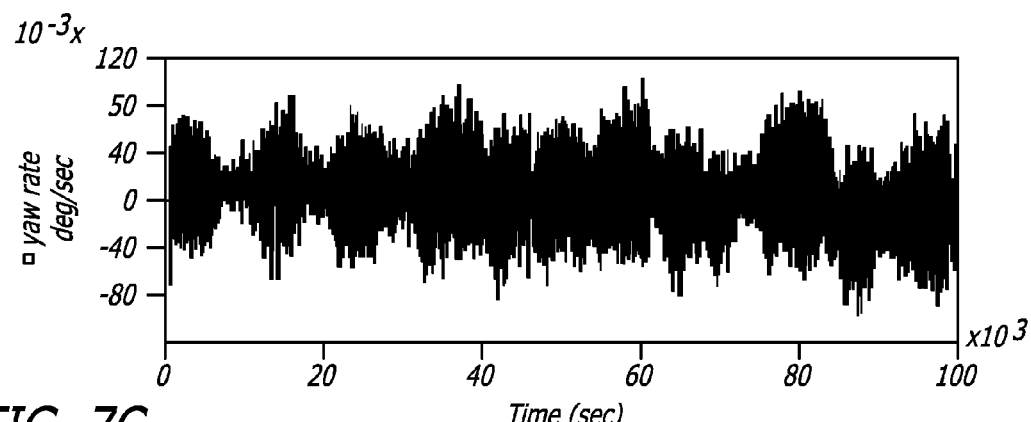
Figure 8A:
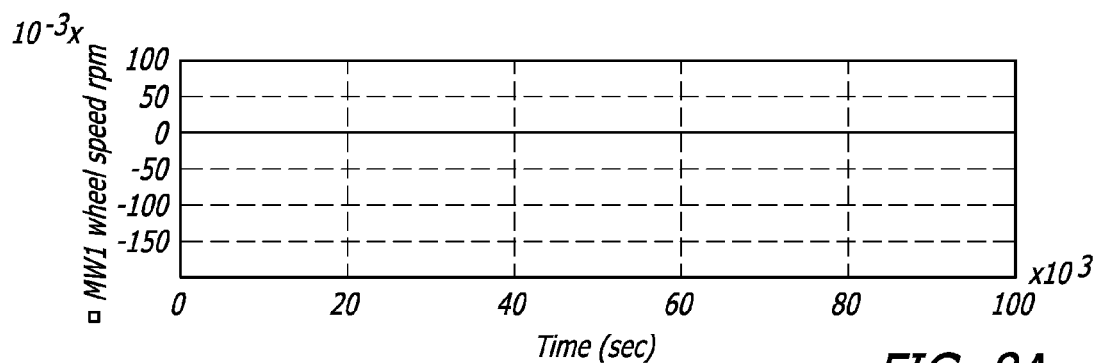
Figure 8B:
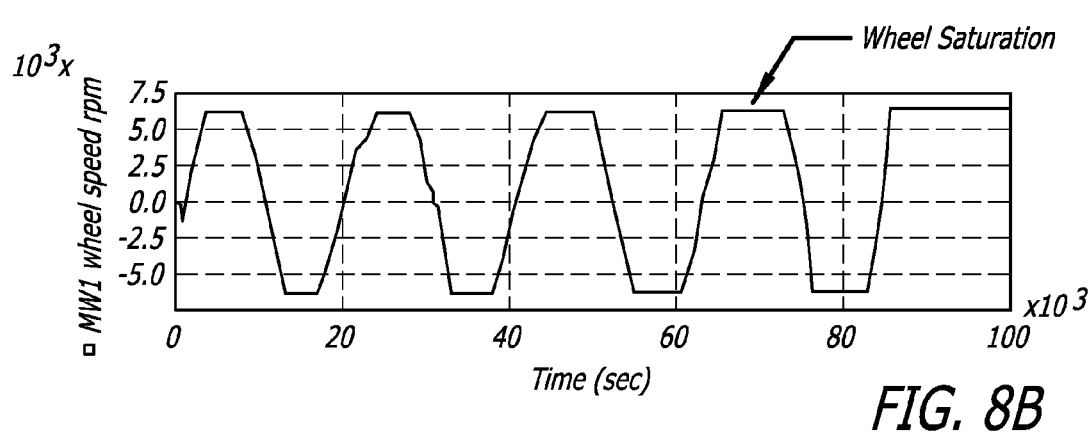
Figure 8C:
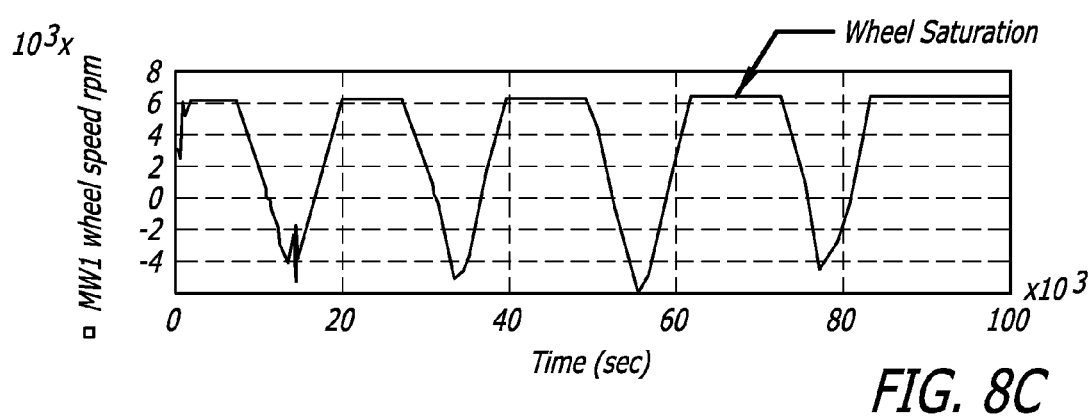
Figure 8D:
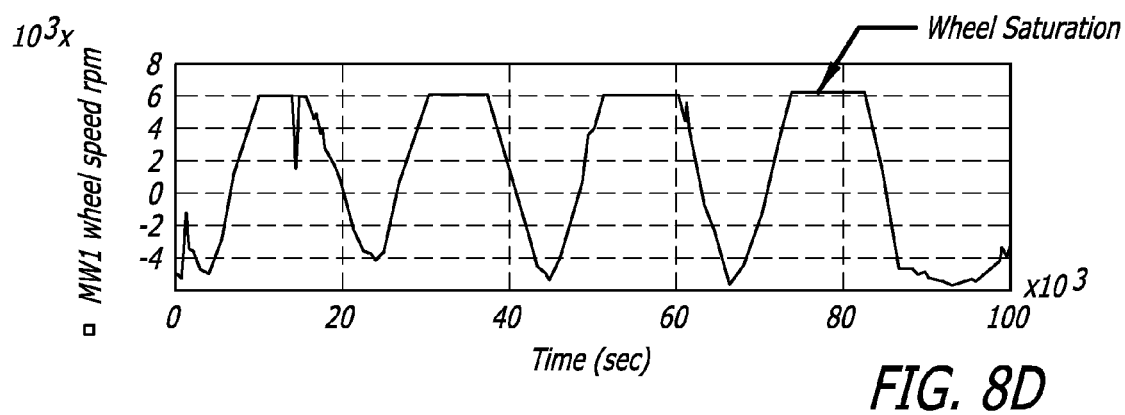

FIGS. 7A, 7B, and 7C show graphical representations of the spacecraft body rates for roll, pitch, and yaw using the prior art Fault Hold Phase algorithm, in accordance with at least one embodiment of the present disclosure.

FIGS. 8A, 8B, 8C, and 8D show graphical representations of the wheel speeds for each of the four wheels using the prior art Fault Hold Phase algorithm, in accordance with at least one embodiment of the present disclosure.

Figure 9A:
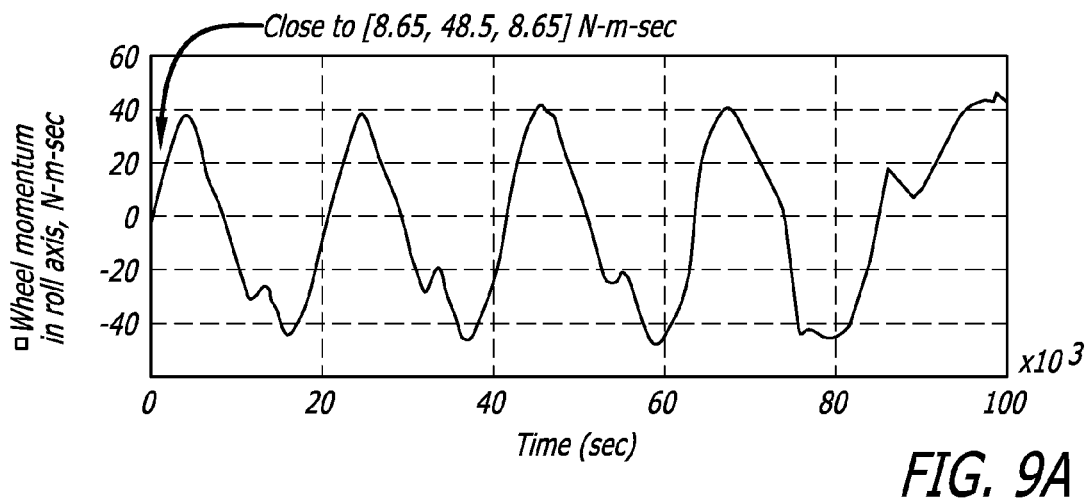
Figure 9B:
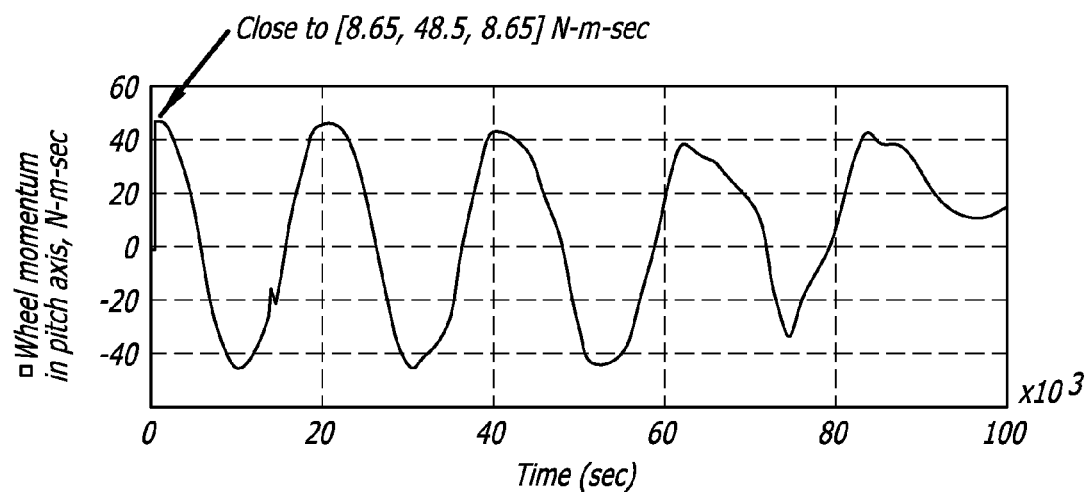
Figure 9C:
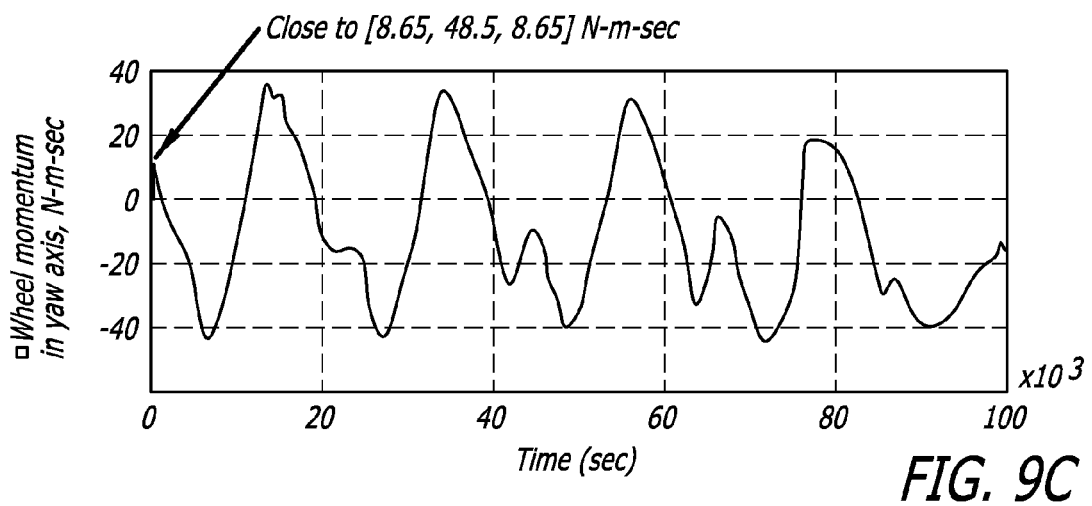

FIGS. 9A, 9B, and 9C show graphical representations of the total wheel momentum in the spacecraft body frame about the roll, pitch, and yaw axes using the prior art Fault Hold Phase algorithm, in accordance with at least one embodiment of the present disclosure.

Figure 10A:
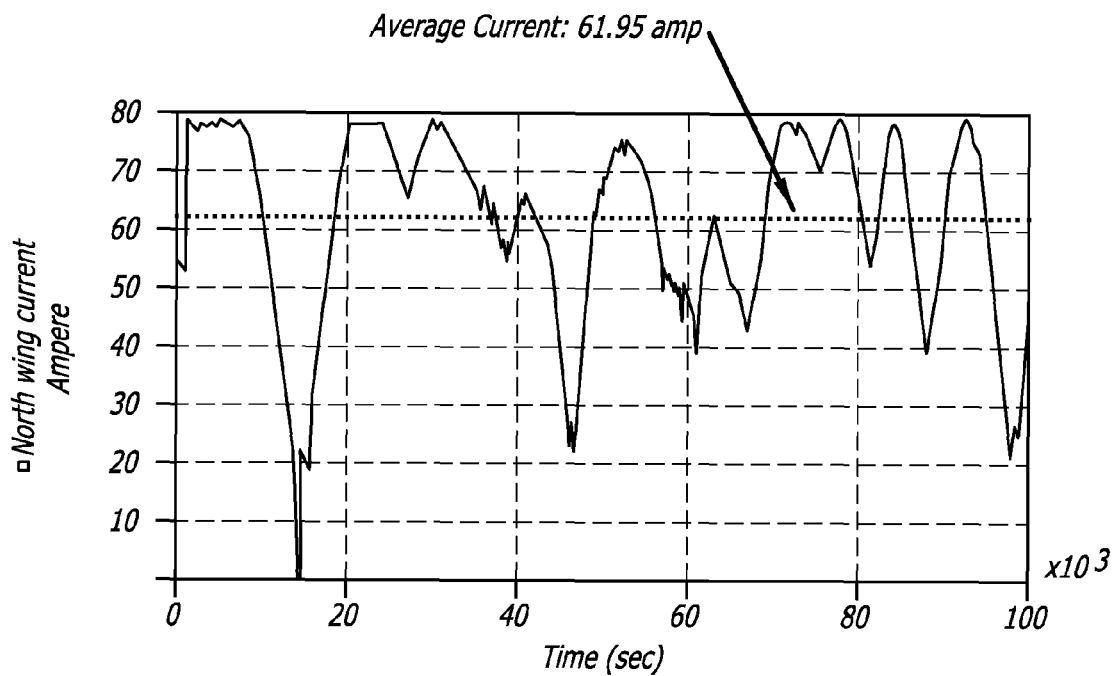
Figure 10B:
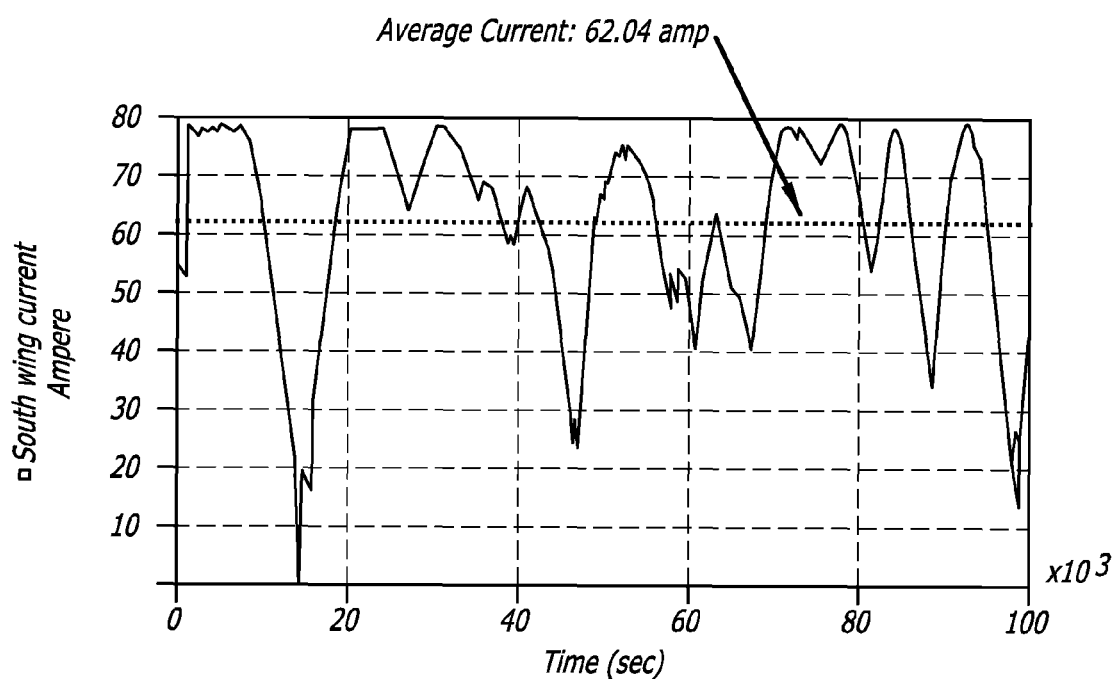

FIGS. 10A and 10B show graphical representations of the solar wing currents for the north and south solar wings of the spacecraft using the prior art Fault Hold Phase algorithm, in accordance with at least one embodiment of the present disclosure.

Figure 11:
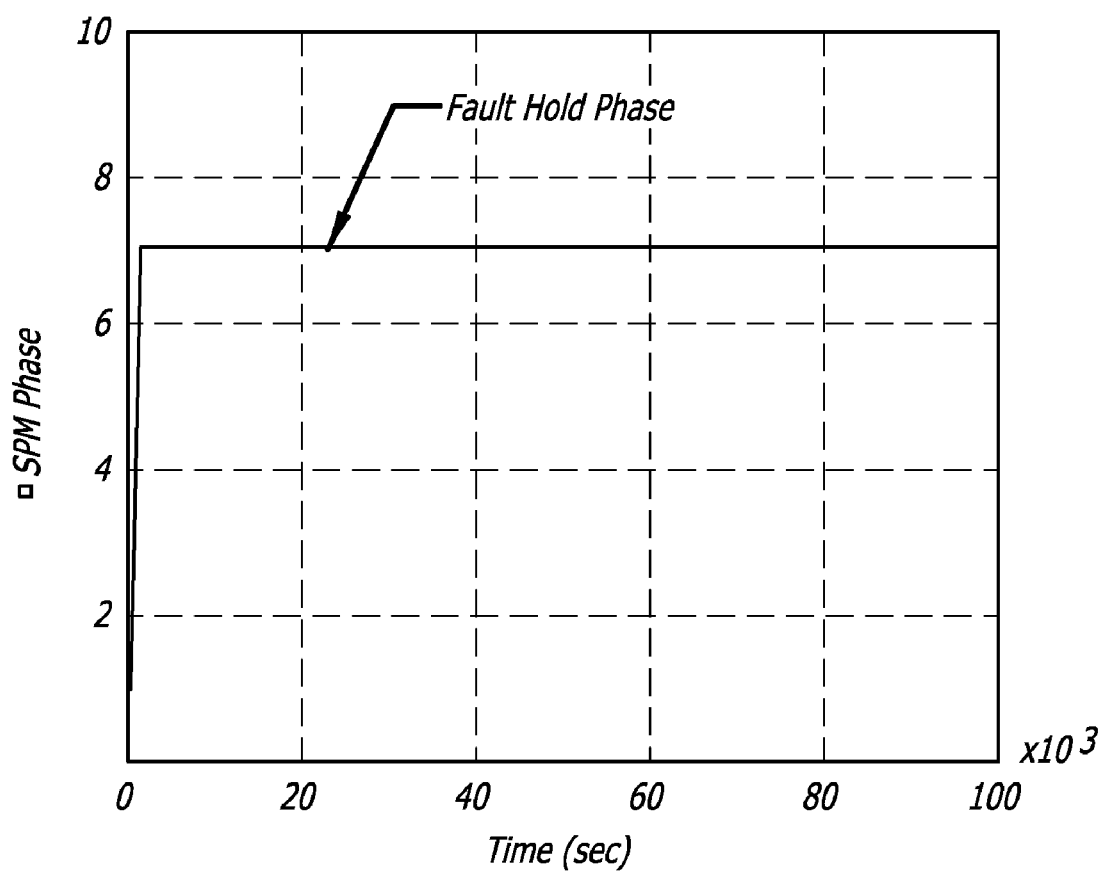

FIG. 11 is a graphical representation of the sun pointing mode phase using the disclosed Fault Hold Phase algorithm, in accordance with at least one embodiment of the present disclosure.

Figure 12A:
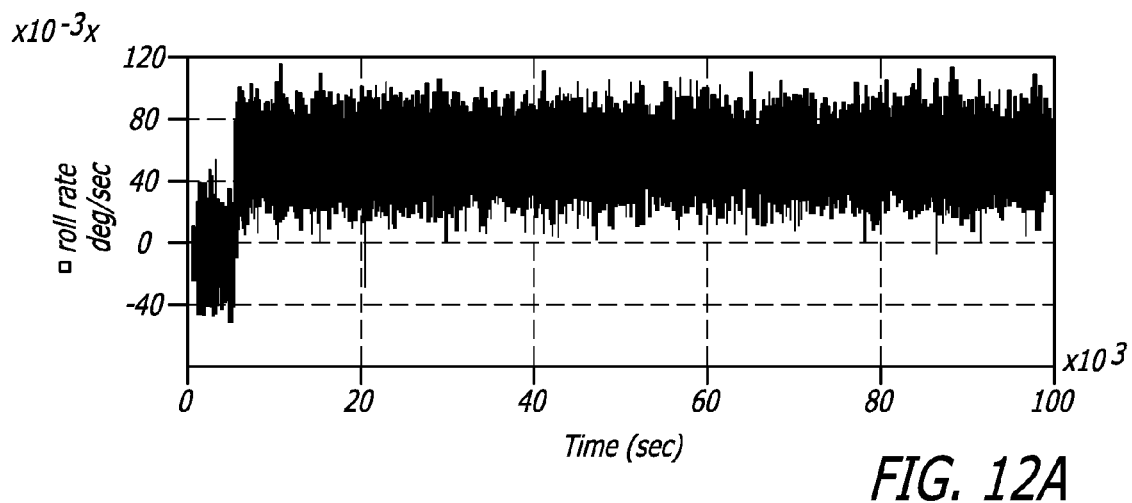
Figure 12B:
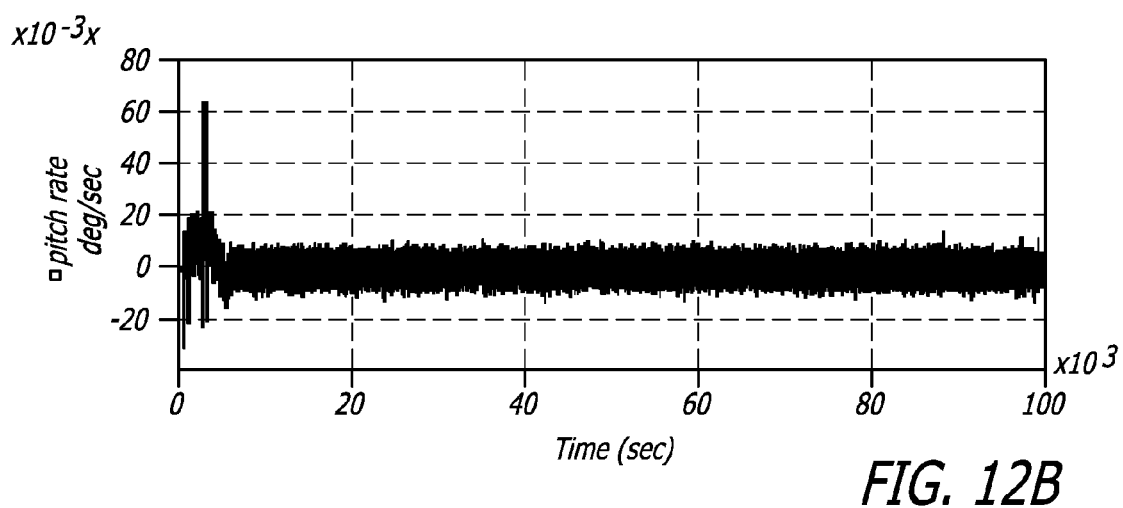
Figure 12C:
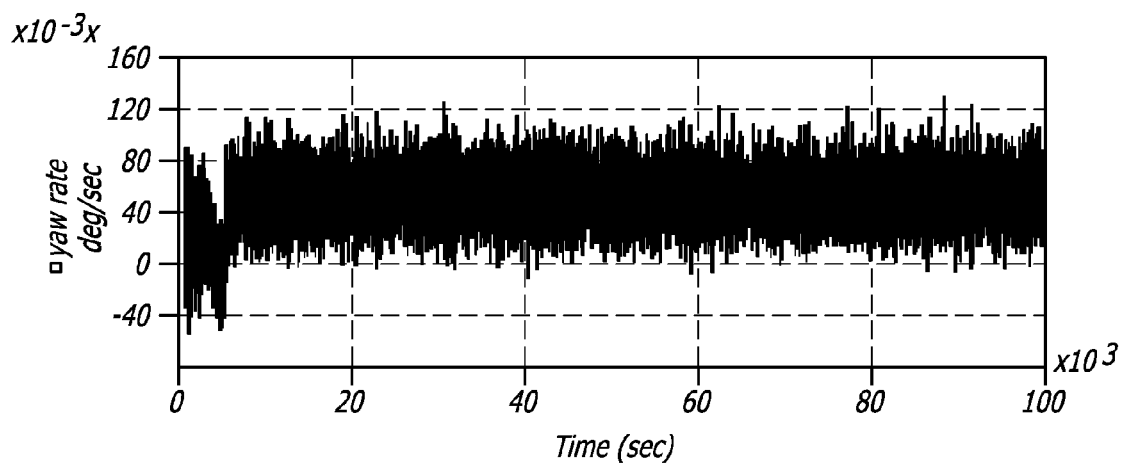
Figure 13A:
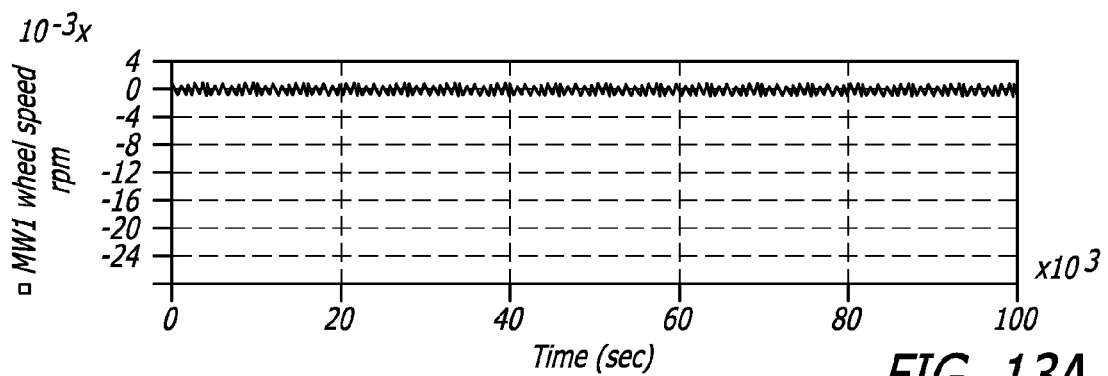
Figure 13B:
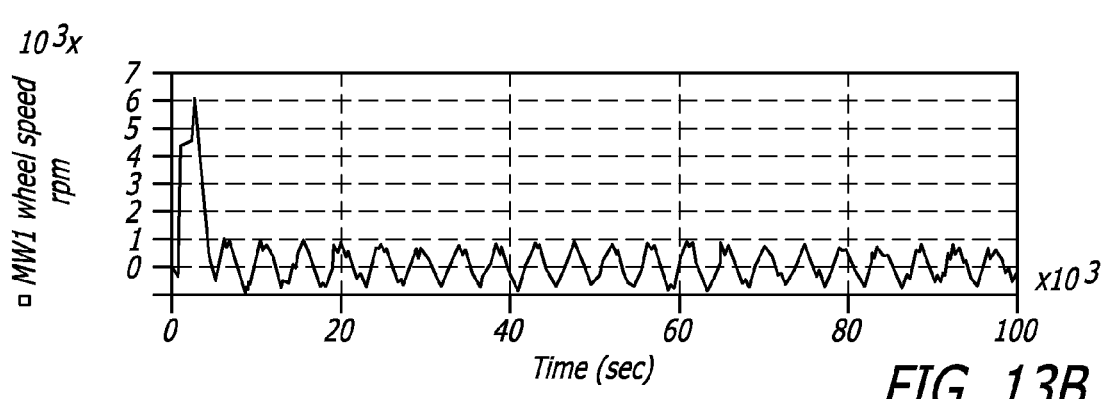
Figure 13C:
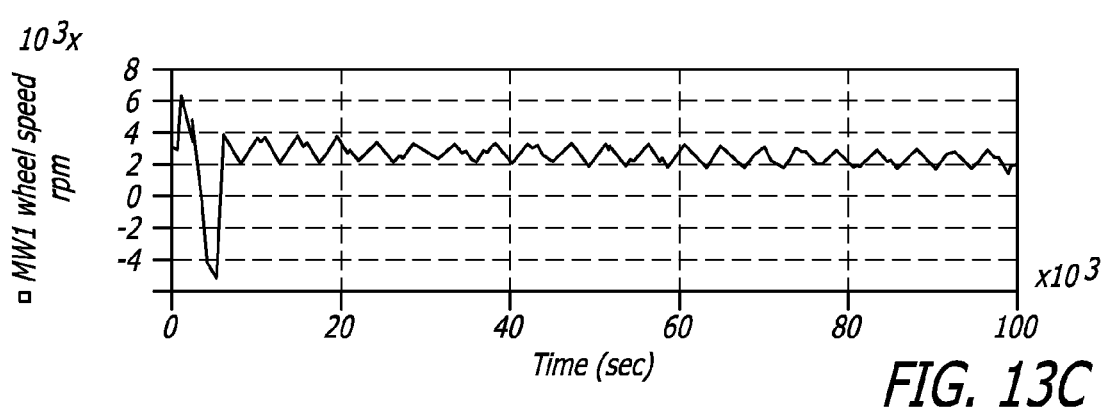
Figure 13D:
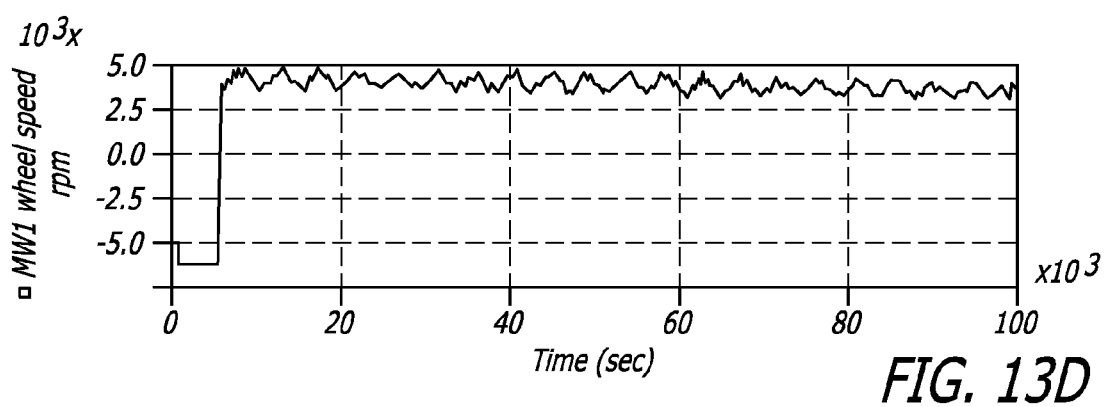

FIGS. 12A, 12B, and 12C show graphical representations of the spacecraft body rates for roll, pitch, and yaw using the disclosed Fault Hold Phase algorithm, in accordance with at least one embodiment of the present disclosure.

FIGS. 13A, 13B, 13C, and 13D show graphical representations of the wheel speeds for each of the four wheels using the disclosed Fault Hold Phase algorithm, in accordance with at least one embodiment of the present disclosure.

Figure 14A:
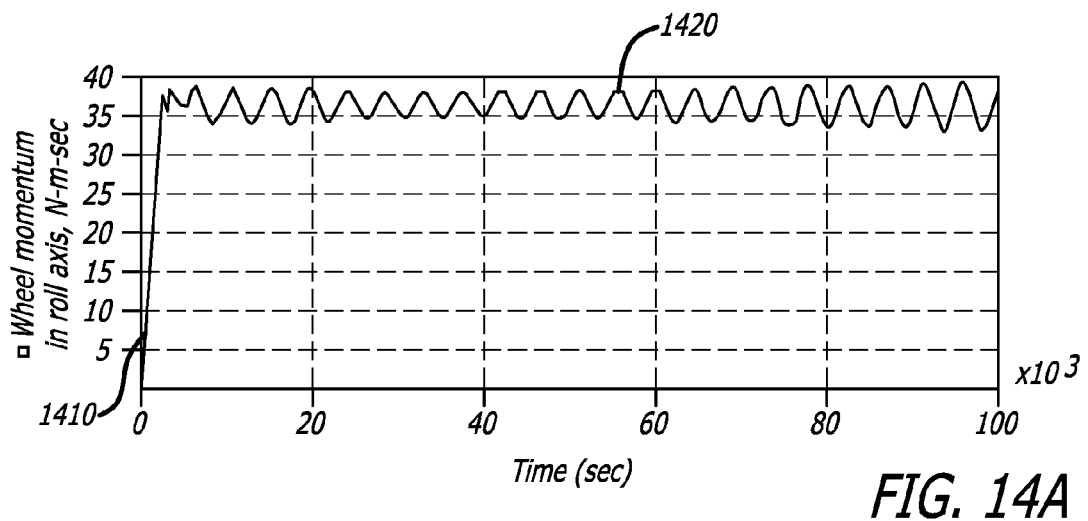
Figure 14B:
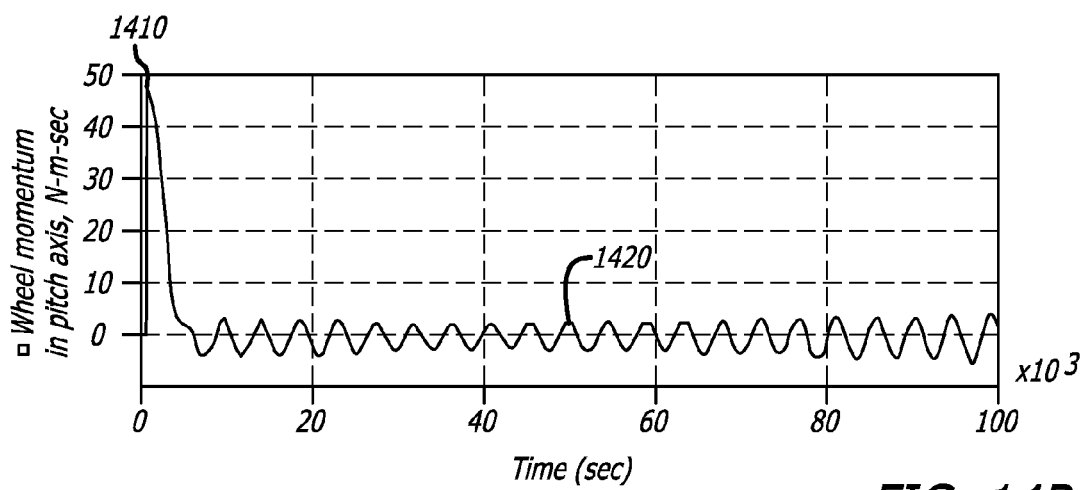
Figure 14C:
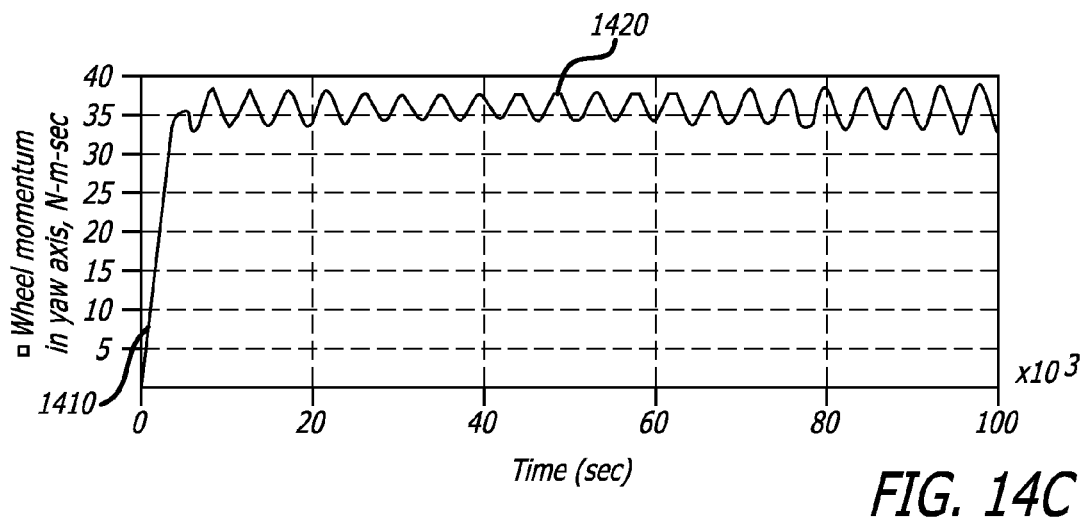

FIGS. 14A, 14B, and 14C show graphical representations of the total wheel momentum in the spacecraft body frame about the roll, pitch, and yaw axes using the disclosed Fault Hold Phase algorithm, in accordance with at least one embodiment of the present disclosure.

Figure 15A:
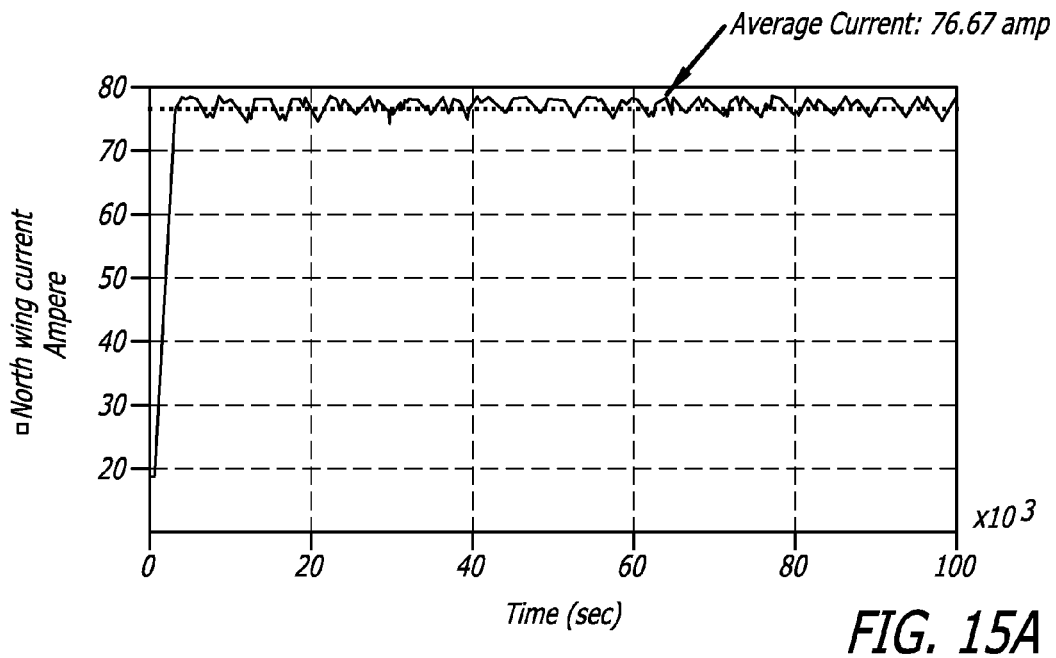
Figure 15B:
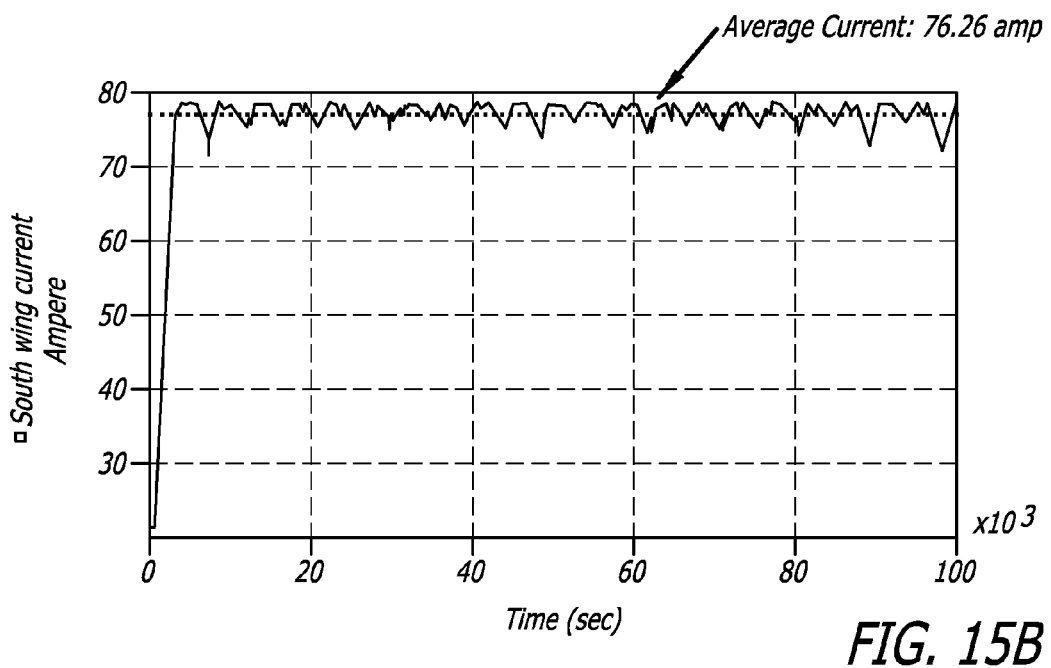

FIGS. 15A and 15B show graphical representations of the solar wing currents for the north and south solar wings of the spacecraft using the disclosed Fault Hold Phase algorithm, in accordance with at least one embodiment of the present disclosure.

DESCRIPTION

The methods and apparatus disclosed herein provide an operative system for innovative optimal spacecraft (S/C) safing. Specifically, this system relates to an innovative methodology and algorithm for optimal spacecraft safing.

When the system momentum bias of a spacecraft exceeds a threshold level that prevents successful sun acquisition using reaction wheels, the disclosed system and method provide a secure way to keep the spacecraft power safe while waiting for ground intervention. The disclosed system and method take advantage of the high system momentum bias that prohibits a successful sun acquisition using wheels, and turn it into a big "resource" of wheel momentum to perform a rotisserie rotation so that the spacecraft can slew at a fast rate in a controlled fashion to keep the spacecraft power safe as well as to maintain telemetry and command (T&C) coverage.

The prior art method for spacecraft safing when there is a high momentum bias is to arbitrarily select the projection of one of the pairs of wheels on the spacecraft coordinate system X-Z plane as the slew axis. This method then assigns a low slew rate to start a rotisserie rotation. This may result in wheel saturation, thereby causing the spacecraft to tumble, intermittent T&C coverage, and arbitrary sun exposure to the solar panels. The system and method of present disclosure provide an innovative methodology to first slew the spacecraft by using the projection of the pair of wheels on the spacecraft X-Z plane that lies closest to the large momentum bias vector to align with the momentum bias vector. Then, the large momentum bias is used as a resource to perform the rotisserie rotation. This allows the spacecraft to rotate at a much higher rate and in a controlled manner so that maximum sun exposure on the solar panels and T&C coverage can be ensured while waiting for ground intervention. With the disclosed system and method, the spacecraft can be kept perfectly stable, thereby allowing the solar panels to get maximum sun exposure in a controlled manner and allowing for constant T&C coverage.

The primary means of safing the spacecraft is to perform an autonomous sun acquisition on reaction wheel control. This maneuver acquires the sun in the sun sensor, and aligns the solar wings towards the sun. There are certain conditions that can prevent this maneuver from being successful. The total system momentum bias exceeding the storage capability of the Reaction Wheel Assembly (RWA) array is a particularly challenging condition. This invention provides an optimal way of controlling the spacecraft in the presence of such momentum saturation to ensure spacecraft health by providing periodic sun exposure to the solar panels and periodic telemetry and command (T&C) visibility to the ground.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
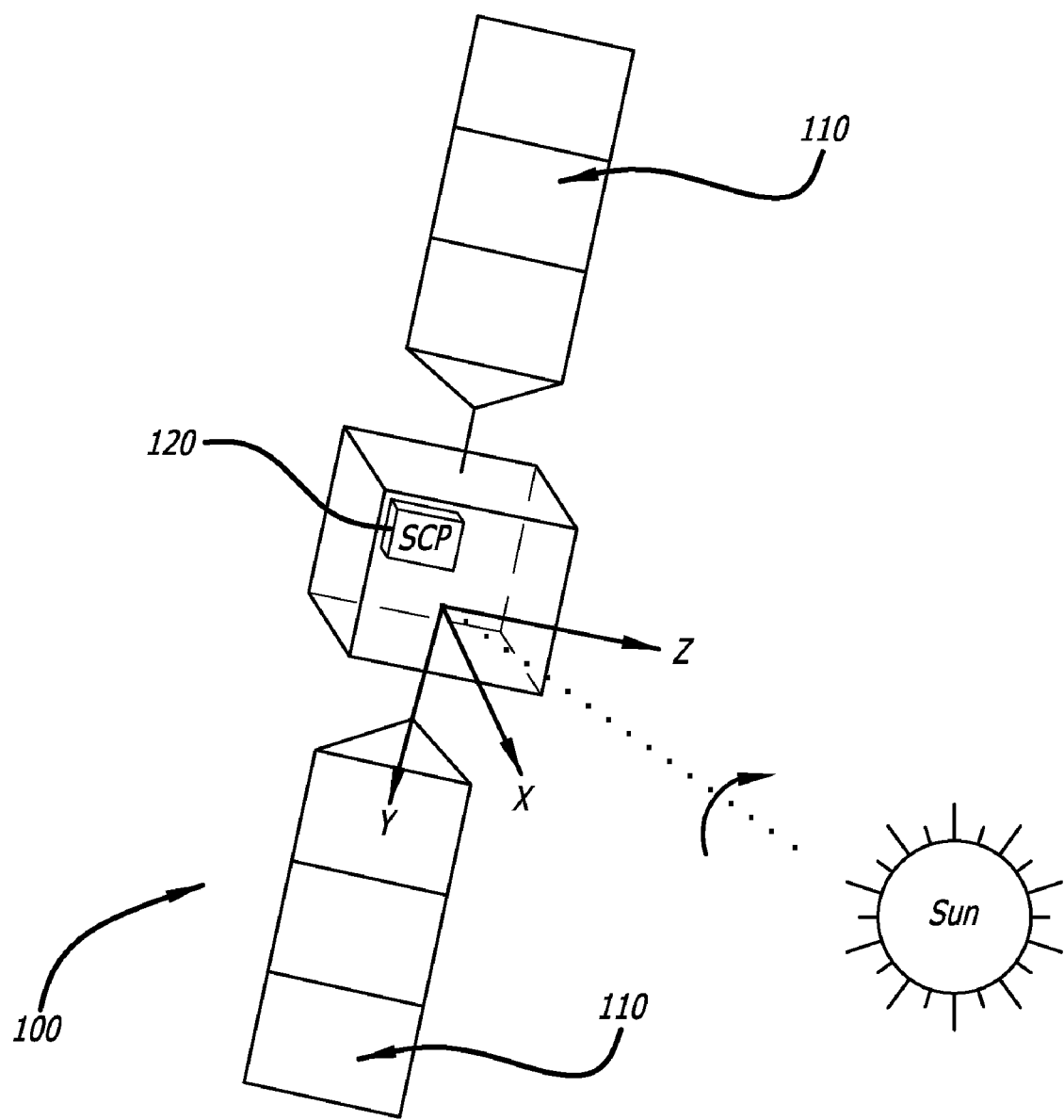
FIG. 1 shows a spacecraft that may be employed for the system and method for innovative optimal spacecraft safing, in accordance with at least one embodiment of the present disclosure.

FIG. 1 shows a spacecraft 100 that may be employed for the system and method for innovative optimal spacecraft safing, in accordance with at least one embodiment of the present disclosure. In this figure, the spacecraft (S/C) 100 is shown to have an orthonormal reference frame, as indicated by the X, Y, and Z axes. The spacecraft 100 also includes sensors (not shown), which are used for determining attitude and rate. Types of sensors included are an earth sensor, a sun sensor, and/or a gyroscope system. In addition, the spacecraft 100 is shown to have two solar wings 110. The spacecraft also includes a reaction wheel system (not shown).

Also in this figure, it can be seen that the spacecraft includes a spacecraft control processor (SCP) 120. The spacecraft control processor is in communication with the reaction wheel system, the earth sensor, the sun sensor, and/or the gyroscope system. The spacecraft control processor 120 is able to read attitude and rate information as well as determine reaction wheel and spacecraft momentum.

Figure 2:
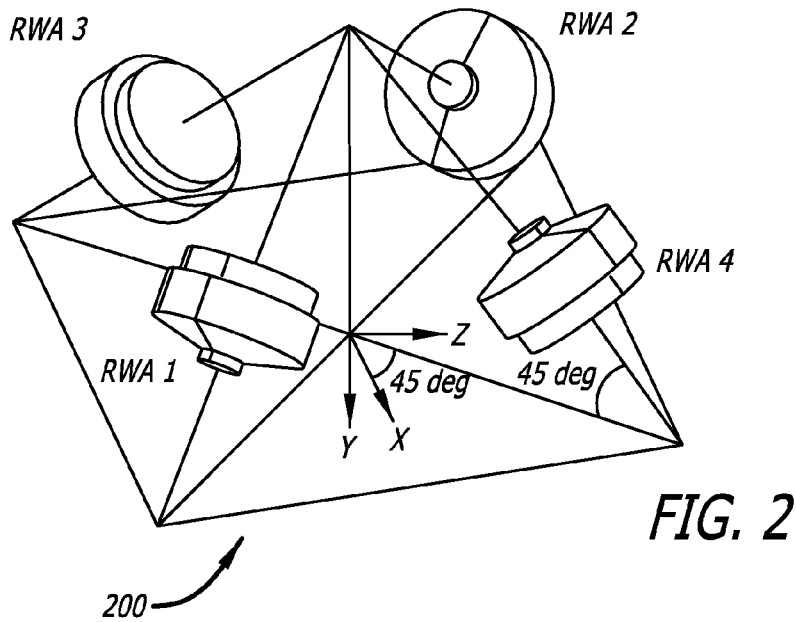
FIG. 2 depicts a reaction wheel system that may be employed with the system and method for innovative optimal spacecraft safing, in accordance with at least one embodiment of the present disclosure.

FIG. 2 depicts a reaction wheel system 200 that is employed with the system and method for innovative optimal spacecraft safing, in accordance with at least one embodiment of the present disclosure. The reaction wheel system 200 comprises four reaction wheel assemblies (RWAs), which are Wheel 1 (RWA 1), Wheel 2 (RWA 2), Wheel 3 (RWA 3), and Wheel 4 (RWA 4).

As can be seen in the figure, the reaction wheel system 200 is constructed in a pyramid configuration. The pyramid orientation is about the body pitch (Y) axis. The X, Y, and Z axes indicate the orientation of the body frame. The base of the pyramid lies on a roll-yaw plane of the spacecraft, which is the X-Z plane of the spacecraft coordinate system. In addition, the projections of the spin axes of the wheels on the X-Z plane are 45 degrees apart from either the X or Z axis.

Fault Hold Phase

Among the sun acquisition sequences for spacecrafts, the Fault Hold Phase is a phase to which a sequence proceeds if the system momentum bias is too high to allow a successful sun acquisition using reaction wheels. It is critical that the spacecraft maintain power safe and T&C coverage while waiting for a ground command during this phase.

Prior Art Algorithm for Fault Hold Phase

The prior art solution for Fault Hold Phase is to select the projection of one of the two pairs of wheels on the spacecraft X-Z plane as the slew axis, and to assign a low slew rate to perform a rotisserie rotation in order to maintain T&C coverage as well as to keep the solar panels periodically exposed to the sun to keep the spacecraft power safe. With all four wheels available, the selection of the wheel pair is arbitrary. Even though the slew rate is low, there is a chance that the wheels may saturate, thereby causing the spacecraft to tumble. The tumbling of the spacecraft is an undesirable situation. The tumbling would cause the exposure of the solar panels to the sun to be arbitrary instead of constant and controlled. As such, as far as spacecraft safing is concerned, the prior art solution not an optimal solution to ensure spacecraft safety.

Disclosed Algorithm for Fault Hold Phase

In order to maintain T&C coverage and obtain power from the solar panels no matter where the sun is located, the spacecraft has to rotate. Since the solar panels lie along the body pitch Y-axis, it is preferred that the spacecraft rotates about a transverse axis (i.e. an axis on the X-Z plane) so that currents can be generated on the solar panels periodically even if the sun is initially located along the Y-axis (i.e. a wing keyhole case). The disclosed algorithm for Fault Hold Phase, which includes a reorientation slew and the determination of the rotisserie axis, the slew direction, and the slew rate, is described as follows.

Figure 3:
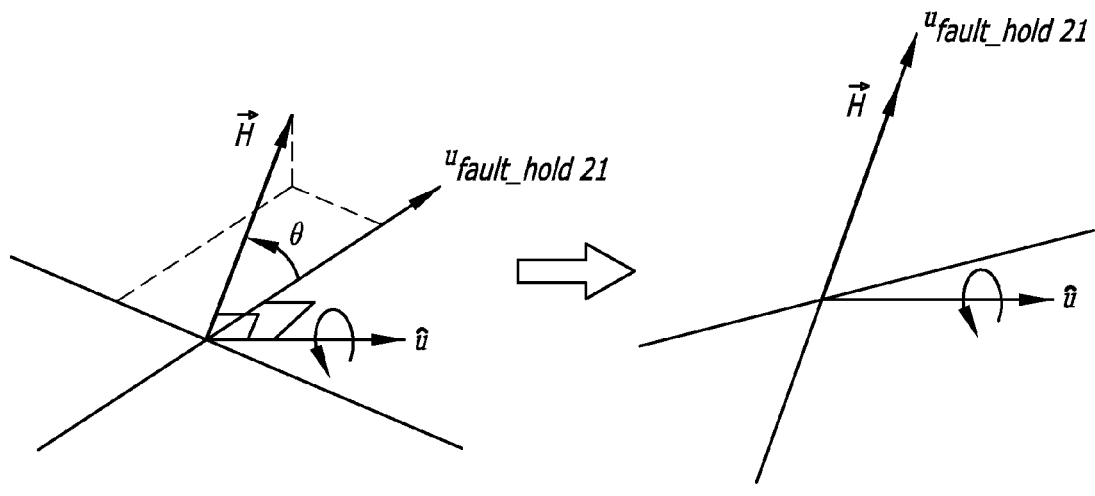
FIG. 3 shows the spacecraft being slewed so as to align the rotisserie axis with the momentum vector for the system and method for innovative optimal spacecraft safing, in accordance with at least one embodiment of the present disclosure.

1) First, set the solar panel drive mode to continuously search for and track the sun by using solar array angle feedback that is derived from measurements from at least one solar array current sensor.
2) Determine the rotisserie axis.
   i) If either Wheel 3 or Wheel 4 fails, then select the projections of the spin axes of Wheel 1 and Wheel 2 on the X-Z plane, $u_{fault\_hold12}$, and $u_{fault\_hold21}$, (two opposite directions) as candidates for the rotisserie axis.

$$u_{fault\_hold\ 12} = \left[\frac{1}{\sqrt{2}}\ 0\ -\frac{1}{\sqrt{2}}\right]$$

$$u_{fault\_hold\ 21} = \left[-\frac{1}{\sqrt{2}}\ 0\ \frac{1}{\sqrt{2}}\right]$$

ii) If either Wheel 1 or Wheel 2 fails, then select the projections of the spin axes of Wheel 3 and Wheel 4 on the X-Z plane, $u_{fault\_hold34}$, and $u_{fault\_hold43}$, (two opposite directions) as candidates for the rotisserie axis.

$$u_{fault\_hold\ 34} = \left[-\frac{1}{\sqrt{2}}\ 0\ -\frac{1}{\sqrt{2}}\right]$$

$$u_{fault\_hold\ 43} = \left[\frac{1}{\sqrt{2}}\ 0\ \frac{1}{\sqrt{2}}\right]$$

iii) If all the wheels are available (i.e. none of the wheels fails), then all of $u_{fault\_hold12}$, $u_{fault\_hold21}$, $u_{fault\_hold34}$, and $u_{fault\_hold43}$ are selected as candidates for the rotisserie axis.
   iv) Dot product the momentum vector with each of the candidates. The candidate that results in the minimum angle with the momentum vector becomes the rotisserie axis $u_{rot}$.
3) Slew the spacecraft until the rotisserie axis aligns with the momentum vector.
   i) Cross product the rotisserie axis $u_{rot}$ with the momentum vector $\vec{H}$ to determine the unit vector $\hat{u}$ for the slew. (The unit vector is perpendicular to both the rotisserie axis and the momentum vector.)
   ii) Slew the spacecraft about the unit vector $\hat{u}$ through an angle of $\theta = \cos^{-1}(u_{rot} \cdot \vec{H})$ with a low slew rate until the rotisserie axis $u_{rot}$ aligns with the momentum vector $\vec{H}$, as shown in FIG. 3 using $u_{rot} = u_{fault\_hold21}$ as the rotisserie axis, for example.
4) Perform a rotisserie rotation about the rotisserie axis to keep the spacecraft power safe.

The rotisserie rate and direction are determined as follows:
   i) Since the rotisserie axis $u_{rot}$ is always in between the spacecraft body X and Z axes, the available momentum for the rotisserie rotation $h_{slew}$ can be computed as $$h_{slew} = |u \cdot \vec{H}| + 2h_w - \sqrt{(\vec{H} \cdot \vec{H}) - (u_{rot} \cdot \vec{H})}\ \text{if all four wheels are available, or}$$

$$h_{slew} = |u \cdot \vec{H}| + h_w - \sqrt{(\vec{H} \cdot \vec{H}) - (u_{rot} \cdot \vec{H})}\ \text{if only three wheels are available,}$$

where $h_w$ is the maximum single wheel momentum.
   ii) Then, the maximum rotisserie rate and direction without saturating the wheels can be computed as $$\vec{\omega}_r = \frac{h_{slew}}{(u_{rot} \cdot I_{sc}) \cdot u_{rot}}(u_{rot})$$

where $I_{sc}$ is the spacecraft inertia matrix.

Since the rotisserie axis $u_{rot}$ aligns with the momentum vector $\vec{H}$, the formula indicates slewing the spacecraft body about the same direction as the momentum vector. The reason for this is that the wheel momentum will be commanded towards the opposite direction, and this provides the maximum wheel momentum capacity for the rotisserie rotation.

Figure 4:
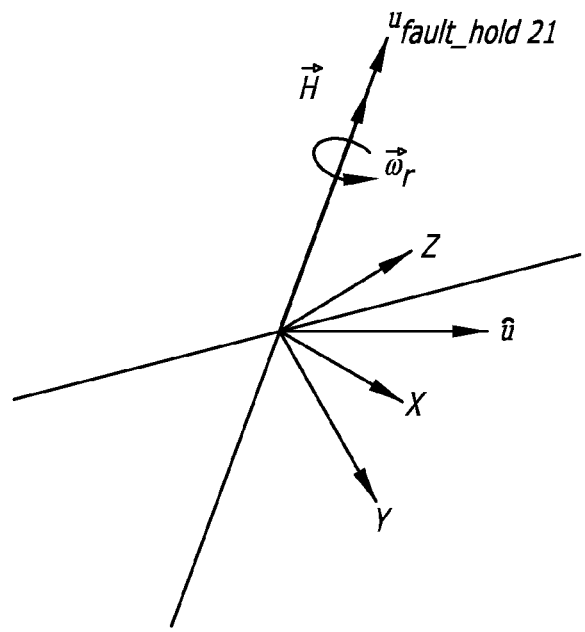
FIG. 4 illustrates the spacecraft being rotated about the rotisserie axis for the system and method for innovative optimal spacecraft safing, in accordance with at least one embodiment of the present disclosure.

The rotisserie rotation is illustrated in FIG. 4 using $u_{rot} = u_{fault\_hold21}$ as the rotisserie axis, for example.

Figure 5:
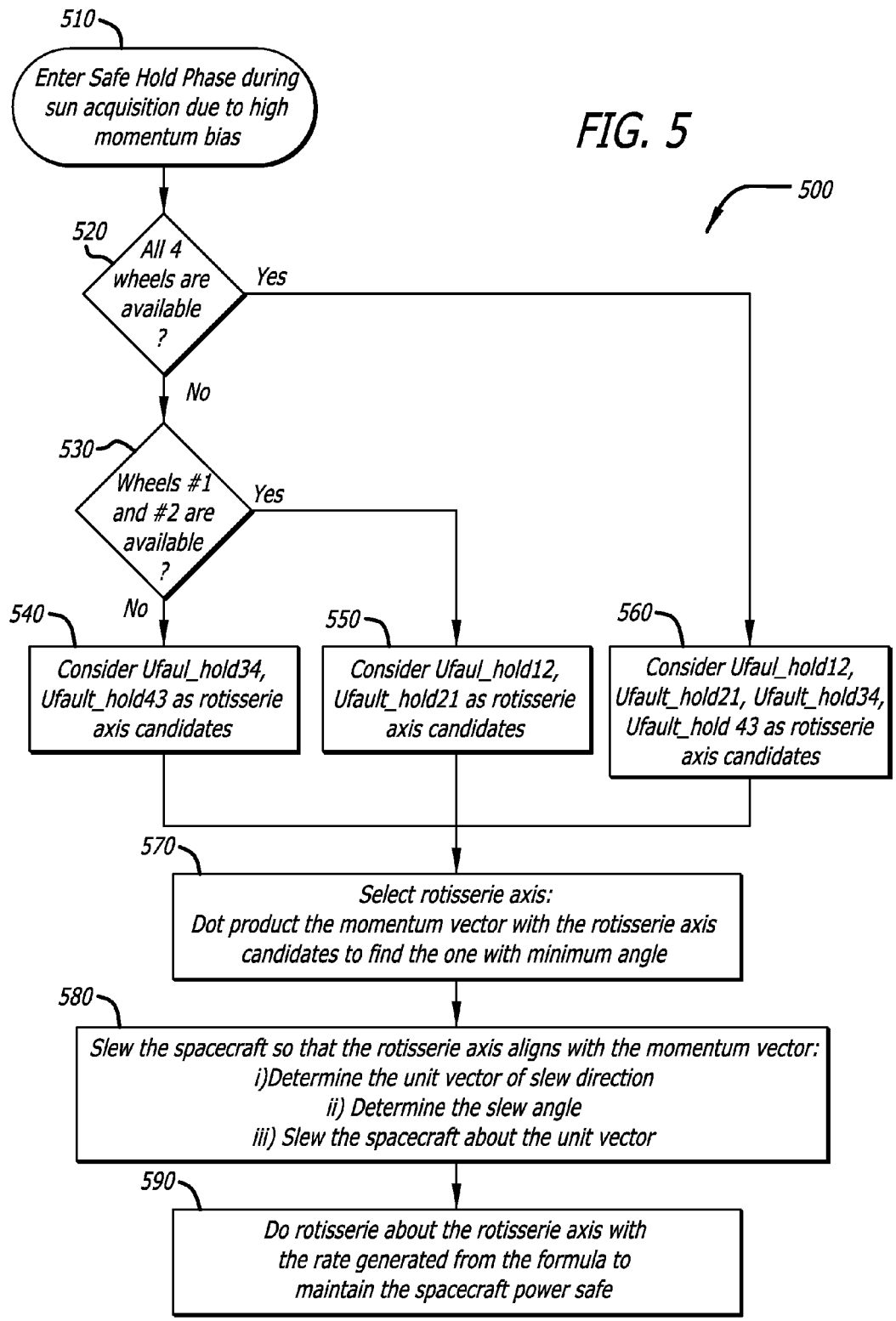
FIG. 5 shows a simplified process flow diagram for the disclosed algorithm for Fault Hold Phase for innovative optimal spacecraft safing, in accordance with at least one embodiment of the present disclosure.

FIG. 5 shows a simplified process flow diagram 500 for the disclosed algorithm for Fault Hold Phase for innovative optimal spacecraft safing, in accordance with at least one embodiment of the present disclosure. In this figure, first the spacecraft enters into a Safe Hold Phase during sun acquisition due to a high momentum bias 510. After the spacecraft enters into a Safe Hold Phase, the spacecraft control processor (SCP) determines if all four wheels of the reaction wheel system are available 520. If the spacecraft control processor determines that not all four wheels are available, the spacecraft control processor then determines if wheel 1 or wheel 2 are available 530.

If the spacecraft control processor determines that wheel 1 or 2 are not available, the spacecraft control processor considers Ufaul_hold34 and Ufaul_hold43 as the rotisserie axis candidates 540. However, if the spacecraft control processor determines that wheel 1 or 2 are available; the spacecraft control processor considers Ufaul_hold12 and Ufaul_hold21 as the rotisserie axis candidates 550. Alternatively, if the spacecraft control processor determines that all four wheels are available, the spacecraft control processor then considers Ufaul_hold12, Ufaul_hold21, Ufaul_hold34, and Ufaul_hold43 as the rotisserie axis candidates 560.

After the spacecraft control processor determines the rotisserie axis candidates, the spacecraft control processor selects the rotisserie axis by first taking the dot product of the momentum vector with each of the candidates 570. The rotisserie axis will be the candidate that has the minimum angle with the momentum vector 570.

After a rotisserie axis is chosen, the spacecraft control processor slews the spacecraft until the rotisserie axis aligns with the momentum vector 580. This is achieved by the spacecraft control processor first determining the unit vector of the slew direction 580. Then, the spacecraft control processor determines the slew angle 580. After the slew angle is determined, the spacecraft control processor slews the spacecraft about the unit vector 580.

Then, after the spacecraft is slewed about the unit vector, the spacecraft control processor causes the spacecraft to perform a rotisserie rotation about the rotisserie axis at a rate generated from a formula that is used to maintain the spacecraft power safe 590.

Simulation Test Results

The performance of the prior art Fault Hold Phase algorithm and the disclosed Fault Hold Phase algorithm were compared by using simulation tests. In order to test for the worst-case scenario (i.e., the three-wheel case), the simulation tests assumed that Wheel 1 is failed, and that only Wheel 2, Wheel 3 and Wheel 4 are available.

The initial angular momentum bias on reaction wheels in body frame was set to [8.65, 48.5, 8.65] N-m-sec. That is, the total initial wheel momentum bias (i.e., the RSS of the momentum bias in all the three axes) was 50 N-m-sec.

With this initial wheel momentum bias set, the rotisserie axis determined from either the prior art Fault Hold Phase algorithm or the disclosed Fault Hold Phase algorithm was $$u_{fault\_hold\ 43} = \left[\frac{1}{\sqrt{2}}\ 0\ \frac{1}{\sqrt{2}}\right].$$

The sunline was chosen to lie along the rotisserie axis. For the simulation of the prior art Fault Hold Phase algorithm, this orientation was set at the very beginning. For the simulation of the disclosed Fault Hold Phase algorithm, the momentum bias vector was set to be aligned with the sunline, then $u_{fault\_hold43}$ was slewed to be aligned with the momentum bias vector, thereby aligning with the sunline. For both the prior art Fault Hold Phase algorithm and the disclosed Fault Hold Phase algorithm, it was expected that the solar wings would lie perpendicular to the sunline during the rotisserie rotation so that the maximum wing current can be generated. Both simulations were run for 100,000 seconds so that long-term body rate, wheel momentum situation, and solar wing current can be observed.

For the simulation of the performance of the disclosed Fault Hold Phase algorithm, the same high initial angular momentum bias was imposed on the reaction wheels, which was [8.65, 48.5, 8.65] N-m-sec. For the disclosed Fault Hold Phase algorithm, first, the spacecraft was slewed about the rotisserie axis $u_{fault\_hold43}$ to align the rotisserie axis with the momentum bias vector. Then, the rotisserie rotational rate was calculated using a rate formula. Due to the high momentum resource available after the alignment of the rotisserie axis and the momentum bias vector, a rotisserie rate of ([0.057, 0, 0.057] deg/sec) was produced, which is four times higher than the rotisserie rate that was used in the simulation of the performance of the prior art Fault Hold Phase algorithm. The results of both of the simulation tests are as follows.

Figure 6:
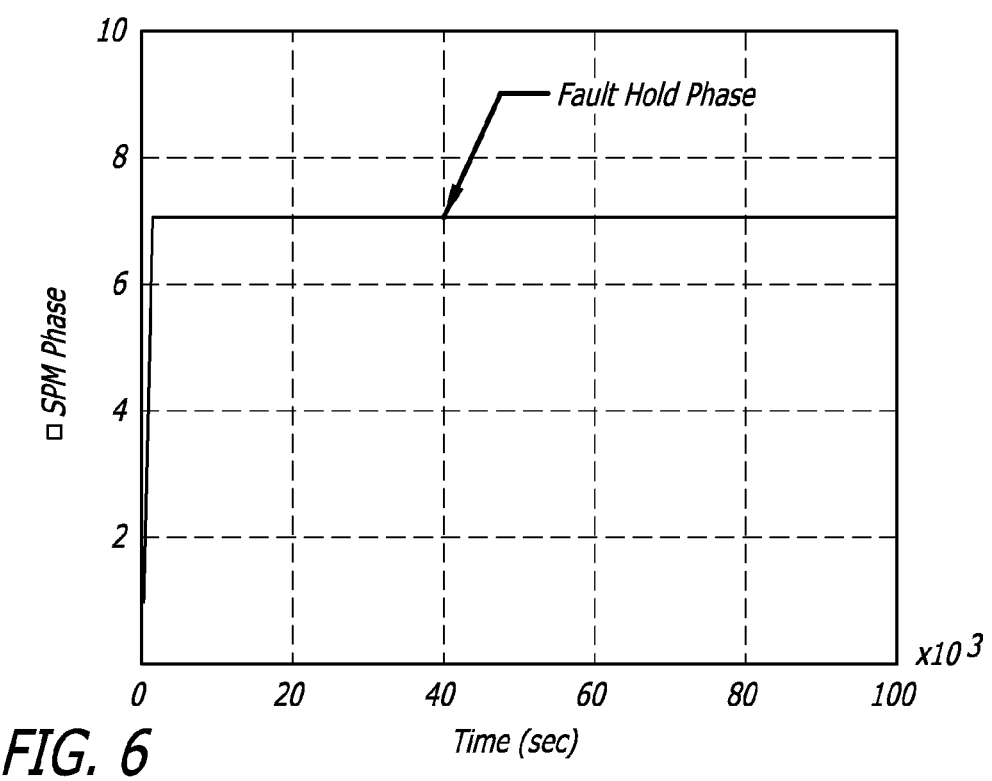
FIG. 6 is a graphical representation of the sun pointing mode phase using the prior art Fault Hold Phase algorithm, in accordance with at least one embodiment of the present disclosure.

FIG. 6 is a graphical representation of the sun pointing mode phase using the prior art Fault Hold Phase algorithm, in accordance with at least one embodiment of the present disclosure. In this figure, as can be seen, the sequence transitions to Fault Hold Phase at Phase 7, which occurs quickly after the simulation starts because the initial momentum bias exceeds the momentum threshold to guarantee a successful sun acquisition using reaction wheels.

FIGS. 7A, 7B, and 7C show graphical representations of the spacecraft body rates for roll, pitch, and yaw using the prior art Fault Hold Phase algorithm, in accordance with at least one embodiment of the present disclosure. With the prior art Fault Hold Phase algorithm, the commanded rotisserie rate is set at a low, arbitrary value. For this simulation, it was set to be [0.014, 0, 0.014] deg/sec in the roll, pitch, and yaw axes, respectively. However, even with such a low commanded rate, the spacecraft still cannot achieve the rate because of the wheel saturation, as can be seen from the wheel speeds in FIGS. 8A, 8B, 8C, and 8D. In FIG. 7B, it can be seen that the pitch rate not only cannot be held at 0 deg/sec, but is actually increasing.

FIGS. 8A, 8B, 8C, and 8D show graphical representations of the wheel speeds for each of the four wheels using the prior art Fault Hold Phase algorithm, in accordance with at least one embodiment of the present disclosure. For the simulation, the speed limit for each reaction wheel was 6200 rpm. In these figures, it can be seen that Wheel 1 is failed throughout the entire simulation. Also, these figures show that the other three wheels are all saturated. Thus, it is evident that there is not enough wheel momentum to control the spacecraft, not even for such a low commanded rotisserie rate.

FIGS. 9A, 9B, and 9C show graphical representations of the total wheel momentum in the spacecraft body frame about the roll, pitch, and yaw axes using the prior art Fault Hold Phase algorithm, in accordance with at least one embodiment of the present disclosure. These figures show the estimated angular momentum on the reaction wheels as seen by the Spacecraft Control Processor (SCP). As is shown in these figures, the estimated initial wheel momentum bias is very close to the bias [8.65, 48.5, 8.65] N-m-sec that was set in the dynamics.

FIGS. 10A and 10B show graphical representations of the solar wing currents for the north and south solar wings of the spacecraft using the prior art Fault Hold Phase algorithm, in accordance with at least one embodiment of the present disclosure. Due to wheel momentum saturation, the spacecraft cannot maintain a perfect rotisserie rotation about the rotisserie axis, which lies along the sunline. And, the solar wings cannot be maintained perpendicular to the sunline all of the time. Thus, both wing currents drop intermittently, and cannot be maintained at their maximum values.

FIG. 11 is a graphical representation of the sun pointing mode phase using the disclosed Fault Hold Phase algorithm, in accordance with at least one embodiment of the present disclosure. Since the same high initial momentum bias as that of the prior art Fault Hold Phase algorithm simulation is imposed on the reaction wheels, it can be seen from this figure that the sequence transitions to Fault Hold Phase at Phase 7, which quickly occurs after the simulation starts.

FIGS. 12A, 12B, and 12C show graphical representations of the spacecraft body rates for roll, pitch, and yaw using the disclosed Fault Hold Phase algorithm, in accordance with at least one embodiment of the present disclosure. Although the calculated rotisserie rate ([0.057, 0, 0.057] deg/sec) was much higher than that used in the prior art Fault Hold Phase algorithm simulation, other than the sensor noise, as can be seen in these figures, the body rate reaches the commanded rate, and stays at that rate consistently. With the disclosed Fault Hold Phase algorithm, the spacecraft can take advantage of the high momentum bias and transform it into a high momentum resource. Then, the spacecraft control processor can calculate the rotisserie rotational rate to use that resource to the maximum, and not exceed it. Thus, a maximum rotisserie rate can be achieved without saturating the wheels.

FIGS. 13A, 13B, 13C, and 13D show graphical representations of the wheel speeds for each of the four wheels using the disclosed Fault Hold Phase algorithm, in accordance with at least one embodiment of the present disclosure. Again, as with the prior art Fault Hold Phase algorithm simulation, Wheel 1 is shown to be failed throughout the simulation. Wheel 4 is shown to have a minor saturation at the beginning of the test for a short period of time. This minor saturation occurs during the slewing of the rotisserie axis to align with the momentum vector. After the rotisserie axis is aligned with the momentum vector and after the rotisserie rotation starts, the working wheels show no saturation. As can be seen from the figures, there is a large difference between the wheel speeds of the prior art Fault Hold Phase algorithm simulation (see FIGS. 8A, 8B, 8C, and 8D) and the disclosed Fault Hold Phase algorithm simulation (see FIGS. 13A, 13B, 13C, and 13D).

FIGS. 14A, 14B, and 14C show graphical representations of the total wheel momentum in the spacecraft body frame about the roll, pitch, and yaw axes using the disclosed Fault Hold Phase algorithm, in accordance with at least one embodiment of the present disclosure. These estimated wheel momentum figures indicate that the initial momentum bias for the disclosed Fault Hold Phase algorithm simulation, which is ([8.65, 48.5, 8.65] N-m-sec), is the same as that set for the prior art Fault Hold Phase algorithm simulation. At about 5000 sec, the slewing of the spacecraft to align the rotisserie axis $$u_{fault\_hold\ 43} = \left[\frac{1}{\sqrt{2}}\ 0\ \frac{1}{\sqrt{2}}\right]$$

with the momentum vector was completed. The total momentum of 50 N-m-sec is now distributed evenly to the roll and yaw axes. Thus, the momentum vector of the spacecraft body frame becomes [36, 0, 35] N-m-sec. These figures show that the alignment slew is successful, and the subsequent rotisserie rotation performs exactly as expected.

FIGS. 15A and 15B show graphical representations of the solar wing currents for the north and south solar wings of the spacecraft using the disclosed Fault Hold Phase algorithm, in accordance with at least one embodiment of the present disclosure. Due to the high momentum resource, the spacecraft not only can perform the rotisserie rotation much faster, but that spacecraft can also keep the solar wings at a near perfect position to the sunline at all times. Thus, maximum wing currents can be achieved. The large difference between the solar wing currents of the prior art Fault Hold Phase algorithm simulation (see FIGS. 10A and 10B) and the disclosed Fault Hold Phase algorithm simulation (see FIGS. 15A and 15B) demonstrates the superiority of the disclosed Fault Hold Phase algorithm because the average wing current is 24% higher for the disclosed Fault Hold Phase algorithm simulation.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for innovative optimal spacecraft (S/C) safing, the method comprising:
    searching for and tracking the sun by using measurements from at least one solar array current sensor; determining a rotisserie axis;
    taking the cross product of the rotisserie axis and a momentum vector to result in a unit vector;
    slowly slewing the spacecraft about the unit vector through an angle until the rotisserie axis aligns with the momentum vector;
    determining the rotisserie rate so that the maximum rate without saturating the wheels can be used; and
    rotating the spacecraft about the rotisserie axis to keep the spacecraft power safe.

2. The method for innovative optimal spacecraft (S/C) safing of claim 1, wherein to determine the rotisserie axis:
    determine whether there is a failure of any of four wheels of a reaction wheel system, which are wheel 1, wheel 2, wheel 3, and wheel 4;
    the projections of the spin axes of wheel 1 and wheel 2 are two candidates for the rotisseries axis, when wheel 3 or wheel 4 fails;
    dot product the momentum vector with each of the two candidates; and
    the candidate that results in the minimum angle with the momentum vector becomes the rotisserie axis.

3. The method for innovative optimal spacecraft (S/C) safing of claim 1, wherein to determine the rotisserie axis:
    determine whether there is a failure of any of four wheels of a reaction wheel system, which are wheel 1, wheel 2, wheel 3, and wheel 4;
    the projections of the spin axes of wheel 3 and wheel 4 are two candidates for the rotisseries axis, when wheel 1 or wheel 2 fails;
    dot product the momentum vector with each of the two candidates; and
    the candidate that results in the minimum angle with the momentum vector becomes the rotisserie axis.

4. The method for innovative optimal spacecraft (S/C) safing of claim 1, wherein to determine the rotisserie axis:
    determine whether there is a failure of any of four wheels of a reaction wheel system, which are wheel 1, wheel 2, wheel 3, and wheel 4;
    the projections of the spin axes of wheel 1, wheel 2, wheel 3, and wheel 4 are four candidates for the rotisseries axis, when no wheels fail;
    dot product the momentum vector with each of the four candidates; and
    the candidate that results in the minimum angle with the momentum vector becomes the rotisserie axis.

5. The method for innovative optimal spacecraft (S/C) safing of claim 1, wherein the angle is an arccosine of a dot product of the rotisserie axis and the momentum vector.

6. A system for innovative optimal spacecraft (S/C) safing, the system comprising:
    a reaction wheel system, wherein the reaction wheel system comprises four reaction wheels, which are wheel 1, wheel 2, wheel 3, and wheel 4; and
    a spacecraft control processor (SCP) in communication with the reaction wheel system, the spacecraft control processor is operable to:
        (a) search for and track the sun by using measurements from at least one solar array current sensor;
        (b) determine a rotisserie axis;

(c) take the cross product of the rotisserie axis and a momentum vector to result in a unit vector;
(d) (slowly) slew the spacecraft about the unit vector through an angle until the rotisserie axis aligns with the momentum vector;
(e) determine the rotisserie rate so that the maximum rate without saturating the wheels can be used; and
(f) rotate the spacecraft about the rotisserie axis to keep the spacecraft power safe.

7. The system for innovative optimal spacecraft (S/C) safing of claim 6, wherein to determine the rotisserie axis:
determine whether there is a failure of any of the four wheels of the reaction wheel system;
the projections of the spin axes of wheel 1 and wheel 2 are two candidates for the rotisseries axis, when wheel 3 or wheel 4 fails;
dot product the momentum vector with each of the two candidates; and
the candidate that results in the minimum angle with the momentum vector becomes the rotisserie axis.

8. The system for innovative optimal spacecraft (S/C) safing of claim 6, wherein to determine the rotisserie axis:
determine whether there is a failure of any of the four wheels of the reaction wheel system;
the projections of the spin axes of wheel 3 and wheel 4 are two candidates for the rotisseries axis, when wheel 1 or wheel 2 fails;
dot product the momentum vector with each of the two candidates; and
the candidate that results in the minimum angle with the momentum vector becomes the rotisserie axis.

9. The system for innovative optimal spacecraft (S/C) safing of claim 6, wherein to determine the rotisserie axis:
determine whether there is a failure of any of the four wheels of the reaction wheel system;
the projections of the spin axes of wheel 1, wheel 2, wheel 3, and wheel 4 are four candidates for the rotisseries axis, when no wheels fail;
dot product the momentum vector with each of the four candidates; and
the candidate that results in the minimum angle with the momentum vector becomes the rotisserie axis.

10. The system for innovative optimal spacecraft (S/C) safing of claim 6, wherein the angle is an arccosine of a dot product of the rotisserie axis and the momentum vector.

11. The system for innovative optimal spacecraft (S/C) safing of claim 6, wherein the reaction wheel system is constructed in a pyramid configuration.

12. The system for innovative optimal spacecraft (S/C) safing of claim 11, wherein a base of the pyramid configuration lies on a roll-yaw plane of the spacecraft, which is an X-Z plane of a spacecraft coordinate system.

13. The system for innovative optimal spacecraft (S/C) safing of claim 12, wherein the projections of the spin axis of the reaction wheels are 45 degrees apart from either an X or Z axis of the spacecraft coordinate system.

14. A system for innovative optimal spacecraft (S/C) safing, the system comprising:
a reaction wheel system means, wherein the reaction wheel system means comprises four reaction wheels, which are wheel 1, wheel 2, wheel 3, and wheel 4; and
a spacecraft control processor (SCP) means in communication with the reaction wheel system means, the spacecraft control processor means is operable to:
(a) search for and track the sun by using measurements from at least one solar array current sensor means;
(b) determine a rotisserie axis;
(c) take the cross product of the rotisserie axis and a momentum vector to result in a unit vector;
(d) (slowly) slew the spacecraft about the unit vector through an angle until the rotisserie axis aligns with the momentum vector;
(e) determine the rotisserie rate so that the maximum rate without saturating the wheels can be used; and
(f) rotate the spacecraft about the rotisserie axis to keep the spacecraft power safe.

15. The system for innovative optimal spacecraft (S/C) safing of claim 14, wherein to determine the rotisserie axis:
determine whether there is a failure of any of the four wheels of the reaction wheel system means;
the projections of the spin axes of wheel 1 and wheel 2 are two candidates for the rotisseries axis, when wheel 3 or wheel 4 fails;
dot product the momentum vector with each of the two candidates; and
the candidate that results in the minimum angle with the momentum vector becomes the rotisserie axis.

16. The system for innovative optimal spacecraft (S/C) safing of claim 14, wherein to determine the rotisserie axis:
determine whether there is a failure of any of the four wheels of the reaction wheel system means;
the projections of the spin axes of wheel 3 and wheel 4 are two candidates for the rotisseries axis, when wheel 1 or wheel 2 fails;
dot product the momentum vector with each of the two candidates; and
the candidate that results in the minimum angle with the momentum vector becomes the rotisserie axis.

17. The system for innovative optimal spacecraft (S/C) safing of claim 14, wherein to determine the rotisserie axis:
determine whether there is a failure of any of the four wheels of the reaction wheel system means;
the projections of the spin axes of wheel 1, wheel 2, wheel 3, and wheel 4 are four candidates for the rotisseries axis, when no wheels fail;
dot product the momentum vector with each of the four candidates; and
the candidate that results in the minimum angle with the momentum vector becomes the rotisserie axis.

18. The system for innovative optimal spacecraft (S/C) safing of claim 14, wherein the angle is an arccosine of a dot product of the rotisserie axis and the momentum vector.

19. The system for innovative optimal spacecraft (S/C) safing of claim 14, wherein the reaction wheel system means is constructed in a pyramid configuration.

20. The system for innovative optimal spacecraft (S/C) safing of claim 19, wherein a base of the pyramid configuration lies on a roll-yaw plane of the spacecraft, which is an X-Z plane of a spacecraft coordinate system.

* * * * *